(12) United States Patent
Blagg (10) Patent No.: US 11,401,072 B2
(45) Date of Patent: Aug. 2, 2022

(54) HANDS-FREE PORTABLE PRINTER HAVING HOUSING, KNOB AND AT LEAST SENSORS TO DETECT MOTIONS IN DIFFERENT DIRECTIONS, WHILE THE KNOB IS ADAPTED TO ROTATE FOR SCROLLING THROUGH SETS OF ALPHA-NUMERIC CHARACTERS

(71) Applicant: Eric Blagg, Simpsonville, SC (US)

(72) Inventor: Eric Blagg, Simpsonville, SC (US)

( * ) Notice: Subject to any disclaimer, the term of this patent is extended or adjusted under 35 U.S.C. 154(b) by 0 days.

(21) Appl. No.: 17/320,546

(22) Filed: May 14, 2021

(65) Prior Publication Data

US 2021/0354869 A1    Nov. 18, 2021

Related U.S. Application Data

(60) Provisional application No. 62/704,519, filed on May 14, 2020.

(51) Int. Cl.
| | |
|---|---|
| *B41J 3/36* | (2006.01) |
| *B65C 9/46* | (2006.01) |
| *B41J 3/407* | (2006.01) |
| *G06K 15/02* | (2006.01) |
| *B41J 2/205* | (2006.01) |

(52) U.S. Cl.
CPC .............. *B65C 9/46* (2013.01); *B41J 3/36* (2013.01); *B41J 3/4075* (2013.01); *B41J 2/2054* (2013.01); *G06K 15/1885* (2013.01)

(58) Field of Classification Search
None
See application file for complete search history.

(56) References Cited

U.S. PATENT DOCUMENTS

| | | | | |
|---|---|---|---|---|
| 4,427,314 | A | * | 1/1984 | Fujiwara ............ B41J 3/36 708/173 |
| 4,433,925 | A | * | 2/1984 | Fujiwara ............ B41J 3/36 400/636 |
| 5,230,572 | A | | 7/1993 | Hirono et al. |
| 8,622,539 | B2 | | 1/2014 | Schwartz et al. |
| 8,866,861 | B2 | | 10/2014 | Schuh et al. |
| 9,315,044 | B2 | | 4/2016 | Dullaert et al. |
| 2002/0134498 | A1 | | 9/2002 | Pennino et al. |

(Continued)

FOREIGN PATENT DOCUMENTS

| | | |
|---|---|---|
| CN | 209534501 U | 10/2019 |
| JP | 4543593 B2 | 9/2010 |

(Continued)

*Primary Examiner* — Haris Sabah
(74) *Attorney, Agent, or Firm* — Kim and Lahey Law Firm LLC; Douglas W. Kim (57) ABSTRACT

A touchless motion activated printer including a housing for receiving a stock of labels supported within the housing; a controller having a computer readable medium and in communications with a display, touchless input assembly, and a printer; and, a set of computer readable instructions stored on the computer readable medium adapted for receiving input from a user, printing a label, storing the label information and ejecting the label. The printer can include an input area. The printer can be in communications with one or more of IoT device, portable computer device, local area network, wide area network, local computer server, home automation system or any combination.

22 Claims, 9 Drawing Sheets

(56) References Cited

U.S. PATENT DOCUMENTS

| | | | |
|---|---|---|---|
| 2004/0122356 A1 | 6/2004 | Burke et al. | |
| 2005/0045083 A1* | 3/2005 | Canan | D05B 11/00 112/117 |
| 2011/0109678 A1* | 5/2011 | Schwartz | B41J 3/36 347/14 |
| 2013/0321830 A1* | 12/2013 | Jimenez | H04N 1/19594 358/1.13 |
| 2019/0084317 A1 | 3/2019 | Fujii et al. | |
| 2019/0257691 A1 | 8/2019 | Jeong et al. | |

FOREIGN PATENT DOCUMENTS

| | | |
|---|---|---|
| JP | 2010194971 A | 9/2010 |
| WO | 2014122280 A1 | 8/2014 |

\* cited by examiner

HANDS-FREE PORTABLE PRINTER HAVING HOUSING, KNOB AND AT LEAST SENSORS TO DETECT MOTIONS IN DIFFERENT DIRECTIONS, WHILE THE KNOB IS ADAPTED TO ROTATE FOR SCROLLING THROUGH SETS OF ALPHA-NUMERIC CHARACTERS

RELATED APPLICATION

This application claims priority of U.S. Provisional Patent Application 62/704,519 filed on May 14, 2020 and incorporated by reference.

BACKGROUND OF THE INVENTION

1) Field of the Invention

This invention is directed to a hands-free portable self-contained printer with touchless motion activation that can be used to generate content for affixing to articles without the need to contact the printer so that undesired materials are not transferred between the printer, user and article (e.g. food container, packaging and the like).

2) Description of the Related Art

It is highly desirable to prevent the transmission of undesirable materials from one surface to another, including transfer that is the result of a user interaction with various assemblies. There are guidelines in place that are designed for this type of material transmission (e.g. bacteria, viruses, etc.) from one surface to another. For example, the Food and Drug Administration (FDA) and the Center For Disease Control (CDC) have recommendations for commercial operations, such as "Increase the frequency of cleaning and disinfecting of high-touch surfaces such as counter tops and touch pads and within the vehicle, by wiping down surfaces using a regular household cleaning spray or wipe", "Ensure that any wrapping and packaging used for food transport is done so that contamination of the food is prevented", "The time foods being stored, displayed, or delivered are held in the danger zone (between 41° F. and 135° F.) is minimized" and "Frequently disinfect surfaces repeatedly touched by employees or customers such as door knobs, equipment handles, check-out counters, and grocery cart handles, etc." (See https://www.fda.gov/food/food-safety-during-emergencies/best-practices-retail-food-stores-restaurants-and-food-pick-updelivery-services-during-covid-19). These guidelines and procedures are designed to minimize the contact transfer between surface and workers. To further minimize the risk of inadvertent transfers, it is desirable to have touchless surfaces for such devices as printers, scales, points of sale systems and the like, especially in the commercial setting.

However, in the residential setting, the need to avoid undesirable transfers is equally important, especially in certain circumstances such as during high cold periods, high influenza seasons, and even pandemics such as the recent COVID-19. Therefore, having touchless devices that are used with articles, especially articles that are frequently used and touched and can be associated with food and drink, is very desirable for many reasons. One such article that is desirable to be touchless is a printer that is adapted to provide relevant information about a food or drink (food stuff) on a label where the label is generated without touching the printing device.

For example, milk for a newborn can be stored in a refrigerator for up to 4 days, before safety is compromised. Marking or labeling the milk container with the "store until" or "discard date" can be very important. One attempt to address the specific issues with breast milk is shown in United States Patent Application 20040122356 disclosing that "the number of individual labels . . . will be the same as the number of liners . . . and caps . . . provided in each kit" limiting the number of labels to liners. This limits the use of the labels to a very specific purpose. Further, the label requires manual writing on them to provide for an origination date or discard date.

In the food packaging industry, it is also desirable to label food with "store until" or "discard dates". This is also true for home storage of food stuff such as leftovers or when food stuff is purchased in bulk and all or a portion of the food stuff is refrigerated and/or frozen. For example, United States Patent Application Publication 2002/0134498 discloses a food labeling apparatus that uses a single-action actuator that, upon activation by a user, immediately produced a dated label for application to a food container and subsequent storage. Japanese Patent JP4543593 discloses a printing apparatus that prints time limit information on a print medium and information on an object of the time limit information, and in particular, easily inputs information necessary for printing the time limit information on a print medium. However, this printer is far from touchless and specifically states that in operations, that this printer provides for "input of the time limit information by the input dial is performed by rotating the input dial on which a large number of characters and symbols are displayed, aligning the desired characters and symbols with the selected characters, and then pressing the input key."

Accordingly, the present invention seeks to accomplish the following objects of providing a label maker that can (a) be used for multiple items, (b) is touchless to prevent contamination, (c) programmable with predetermined label format and (d) print multiple labels automatically updated with current information.

BRIEF SUMMARY OF THE INVENTION

The above objectives are accomplished by providing a touchless motion activated printer having a housing; an input area defined in the housing for receiving an object; a first sensor carried by the housing for detecting a first motion in the input area; a second sensor carried by the housing for detecting a second motion in the input area; a print head for printing alpha-numeric characters on a label; a feeder motor carried by the housing and adapted for ejecting the label from the housing; an input knob carried by the housing; a display carried by the housing; a controller carried by the housing and in communications with the first sensor, the second sensor, the print head, the feeder motor, the display and a smart appliance; and, wherein the controller includes a set of computer readable instructions adapted for scrolling through a set of fields according to actuation of the input knob, scrolling through a set of alpha-numeric characters according to actuation of the input knob, accepting entered information according to the first sensor detecting the first motion, and printing a label according to the second sensor detecting the second motion.

In a further advantageous embodiment, the input knob is adapted to rotate wherein the controller is configured for scrolling through the set of fields and scrolling through the set of alpha-numeric characters according to rotation of the input knob.

In a further advantageous embodiment, the input knob is adapted to be depressed wherein the controller is configured for scrolling through the set of fields according to depression of the input knob.

In a further advantageous embodiment, the set of fields include expiration date, storage date, sell by date, use by date, item type, unique identifier, graphic, reminder time, name, and any combination thereof.

In a further advantageous embodiment, a transmitter is included and the controller is adapted for transmitting an item information associated with a label to a remote compute device.

In a further advantageous embodiment, the item information is an expiration date printed on the label and associated with an item.

In a further advantageous embodiment, the item information is a reminder associated with the expiration date.

In a further advantageous embodiment, the controller is adapted to display an item information when the first sensor detects the first motion prior to the second sensor detecting the second motion.

In a further advantageous embodiment, the controller is adapted to print a label when the first sensor detects a first motion prior to the second sensor detecting the second motion.

In a further advantageous embodiment, the controller is adapted to display an item information when the second sensor detects the second motion prior to the first sensor detecting the first motion.

In a further advantageous embodiment, the smart appliance is configured to read the label as the label is placed in the appliance and transmit an item information to a remote computer device.

In a further advantageous embodiment, the controller is adapted to receive a set of item information wherein each item information includes an expiration date and is adapted to be printed in a label.

In a further advantageous embodiment, the controller is adapted to display a subset of item information wherein the expiration date is past a predetermined date.

In a further advantageous embodiment, the predetermined date is a current date determined by the controller.

In a further advantageous embodiment, the controller is adapted to transmit an order instruction to a remote provider when the expiration date of an item information is past a predetermined date.

The above objectives are further accomplished according to the present invention by providing a touchless printer having a housing having an input area; a sensor carried by the housing for detecting a motion in the input area; a print head adapted to print alpha-numeric characters on a label; a feeder motor carried by the housing and adapted for ejecting the label from the housing; a display carried by the housing; a controller carried by the housing and in communications with the sensor, the feeder motor, the print head and the display; and, wherein the controller includes a set of computer readable instructions adapted for displaying a first set of alpha-numeric characters on the display, scrolling to a second set of alpha-numeric characters according to the sensor detecting a first motion in a first direction, displaying the second set of alpha-numeric characters on the display and printing a label according to the second set of alpha-numeric characters when the sensor detects a second motion in a second direction.

In a further advantageous embodiment, the label is adapted to be read by a smart appliance.

In a further advantageous embodiment, the second set of alpha-numeric characters is taken from the group consisting of expiration date, storage date, sell by date, use by date, item type, unique identifier, graphic, reminder time, name, and any combination thereof.

The above objectives are further accomplished according to the present invention by providing a touchless motion activated printer having a housing having a sensor for detecting a motion in an input area; a print head adapted to print alpha-numeric characters on a label wherein the label is adapted to be ejected from the housing by a feeder motor; a controller carried by the housing and in communications with the sensor, the feeder motor, the print head and a display; and, wherein the controller includes a set of computer readable instructions adapted for displaying a first set of alpha-numeric characters on the display, scrolling to a second set of alpha-numeric characters according to the sensor detecting a first motion in a first direction, displaying the second set of alpha-numeric characters on the display and printing a label according to the second set of alpha-numeric characters when the sensor detects a second motion in a second direction.

In a further advantageous embodiment, the input area is a recess defined in the housing wherein the sensor is disposed within the input area.

In a further advantageous embodiment, the controller is adapted for automatically determining an expiration date according to an item associated with the label to be printed.

In a further advantageous embodiment, the controller is adapted for transmitting an ordering information to a remote computer according to an approaching expiration date included in the label.

BRIEF DESCRIPTION OF THE SEVERAL VIEWS OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, figures and all reasonable inferences to be drawn therefrom, alone or with consideration of the references incorporated herein.

DETAILED DESCRIPTION OF THE INVENTION

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Figure 1:
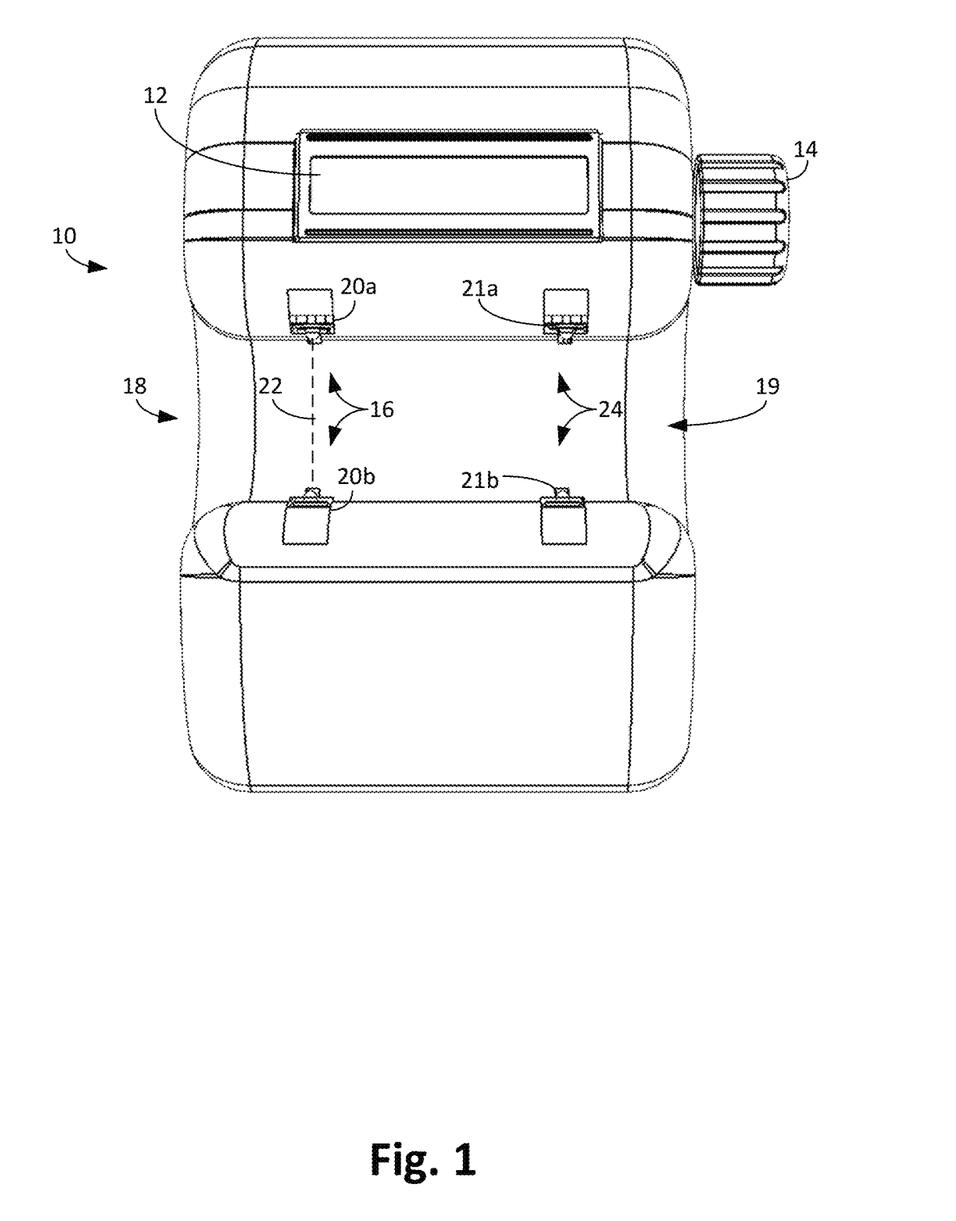
FIG. 1 shows a front elevation view of an embodiment of a touchless motion activated printer according to the present invention.

The invention is directed to a portable touchless motion activated printer that can be used for day-to-day labeling for uses not limited to the office environment. Referring to FIG. 1, housing 10 includes display 12 and input knob 14 that can rotate to scroll through and can be depressed to select options. A first touchless input assembly 16 can be carried by the housing and allow for interaction between a user and the printer without physical contact. The first touchless input assembly can be included in an input area 18 allowing an object such as the user's hand to pass between two sensors 20a and 20b. The first touchless input assembly can include a beam break sensor so that when a beam 22 is disrupted by an object, such as the wave of the hand, input is generated and can be recognized by a controller. The housing can include a second touchless input assembly 24 as well.

Figure 2:
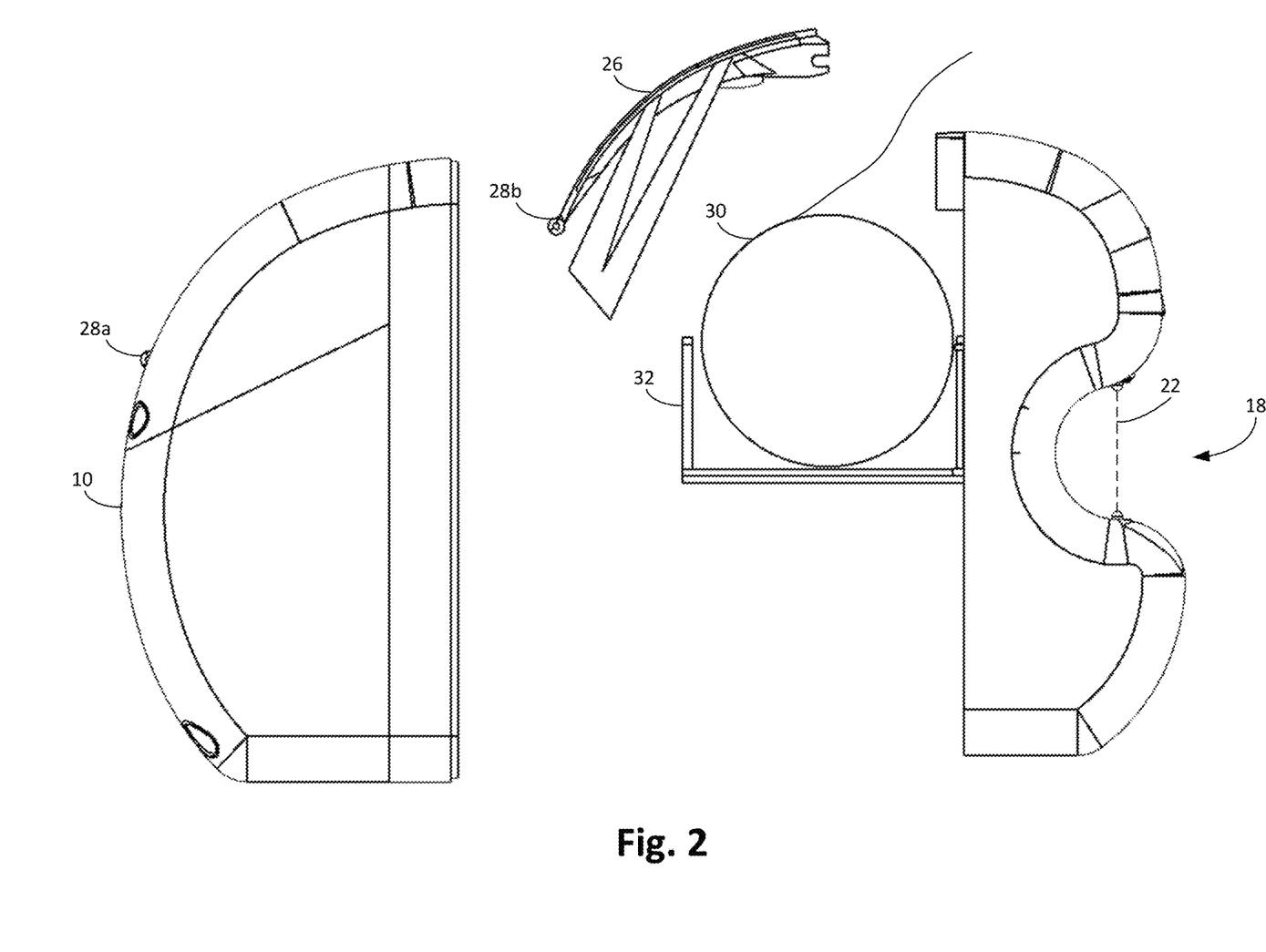
FIG. 2 shows a side elevation exploded view of the touchless motion activated printer according to the present invention.

Referring to FIG. 2, then input area 18 is shown disposed on one side of housing 10. The input area allows an object to pass through the beam 22. An access panel 26 can be attached to the housing by a hinge 28a and 28b or can be removably attached to the housing. The access panel allows paper or labels 30 to be placed in the housing where it can rest on label support 32.

Figure 3:
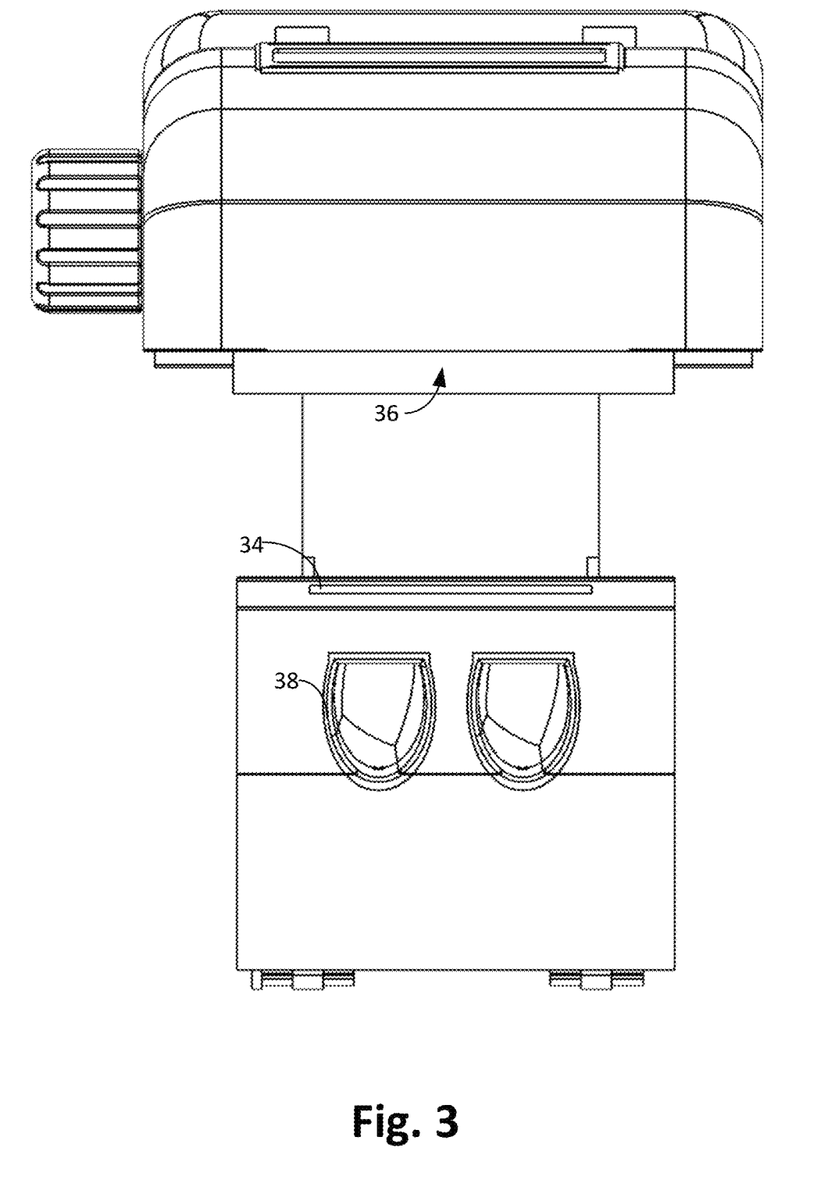
FIG. 3 shows a top plan exploded view of the touchless motion activated printer according to the present invention.

Referring to FIG. 3, the label paper can be fed through slot 34 or through a slot 36 defined between the access panel and a portion of the housing. The slot can be adjacent to a tear bar or an auto cutter. When the label or paper is ejected from the housing, it can be torn by the user or partially or completely cut allowing for the user remove the label or paper from the housing without having to physically handle the printer. The access panel can include one or more depressions 38 allowing the user to better grip the access panel for opening the panel to replenish the printing medium for the purpose of opening the panel to replenish the printing medium (e.g. paper roll).

Figure 4A:
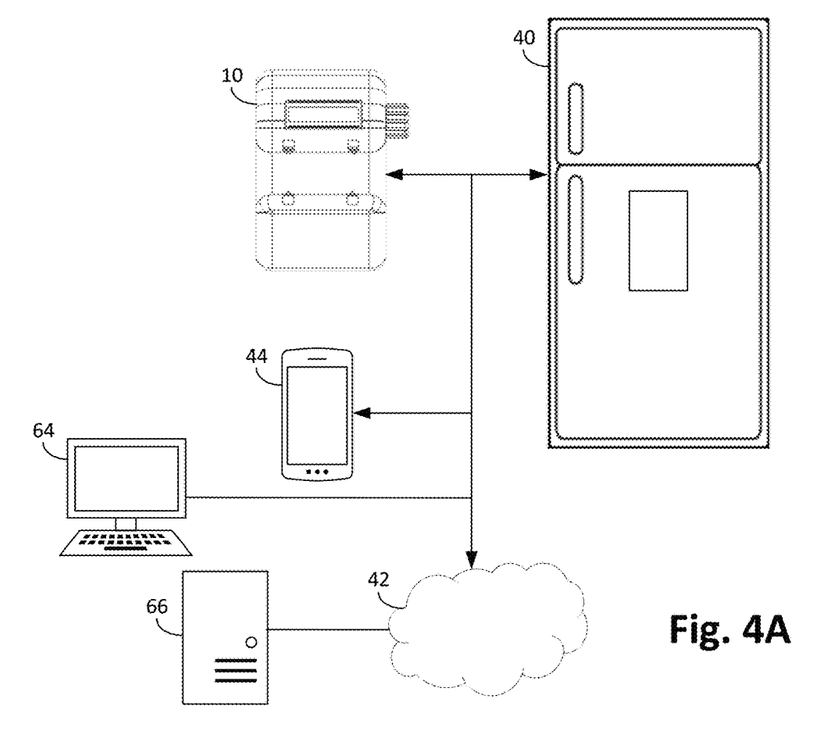
FIG. 4A shows a schematic of aspects of the touchless motion activated printer according to the present invention.
Figure 4B:
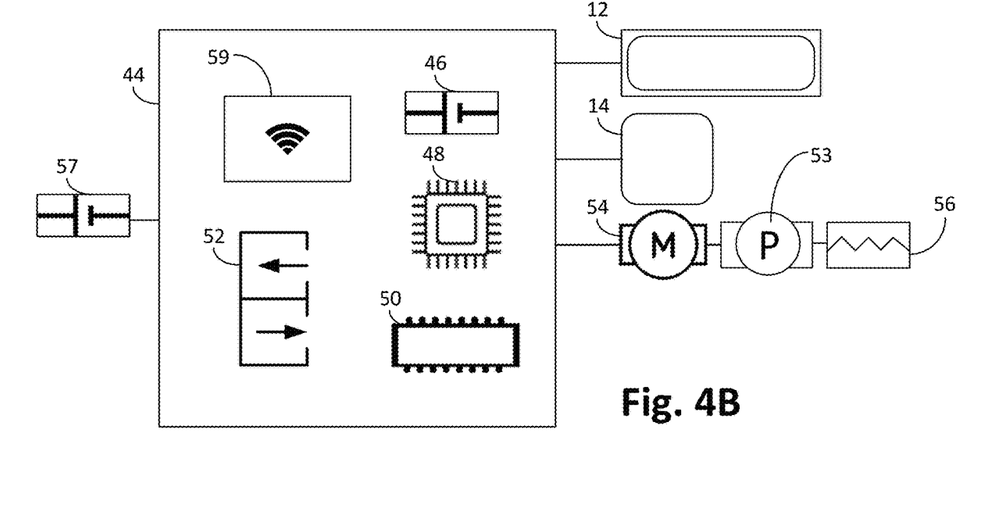
FIG. 4B shows a schematic of aspects of the touchless motion activated printer according to the present invention.
Figure 9:
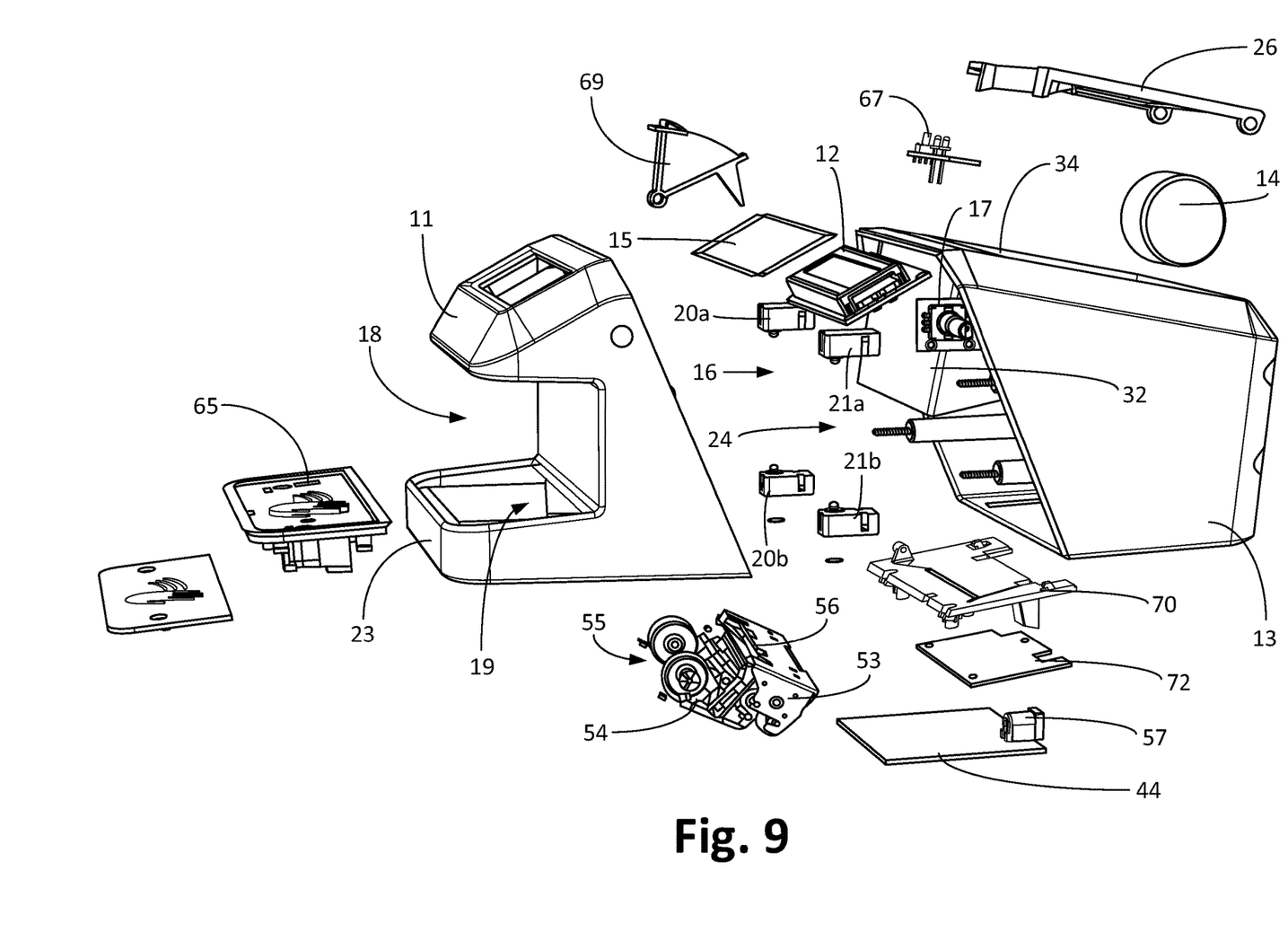

Referring to FIGS. 4A and 4B, in one embodiment, the printer 10 in context of a larger environment is shown. Printer 10 can include a transceiver 59 that can be in communications with other devices such as a refrigeration unit 40, network 42, portable device 44 (e.g. smartphone), or any combination. In one embodiment, the printer 10 includes a controller 44 in communications with display 12, input knob 14, print head 53, feeder motor 54 and auto-cutter 56 (See also FIG. 9). The controller 44 can include an internal power supply 46 (e.g. battery, rechargeable battery, capacitor, and the like), processor 48, computer readable medium 50, input/output (I/O) module 52. An external power source 57 can be connected to the controller 44 to power the controller and its components.

Figure 5:
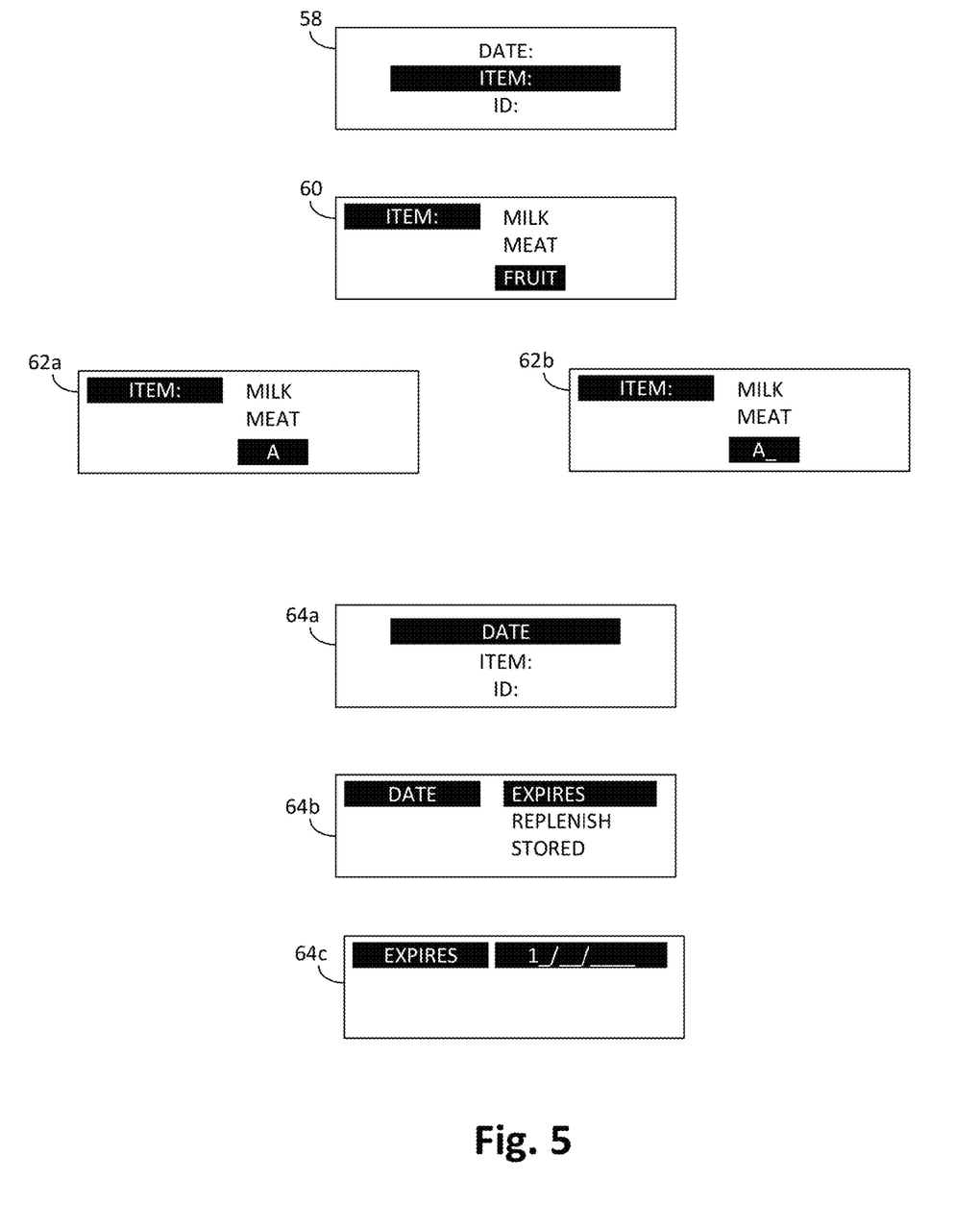
FIG. 5 shows a schematic of aspects a display of the touchless motion activated printer according to the present invention.
Figure 6:
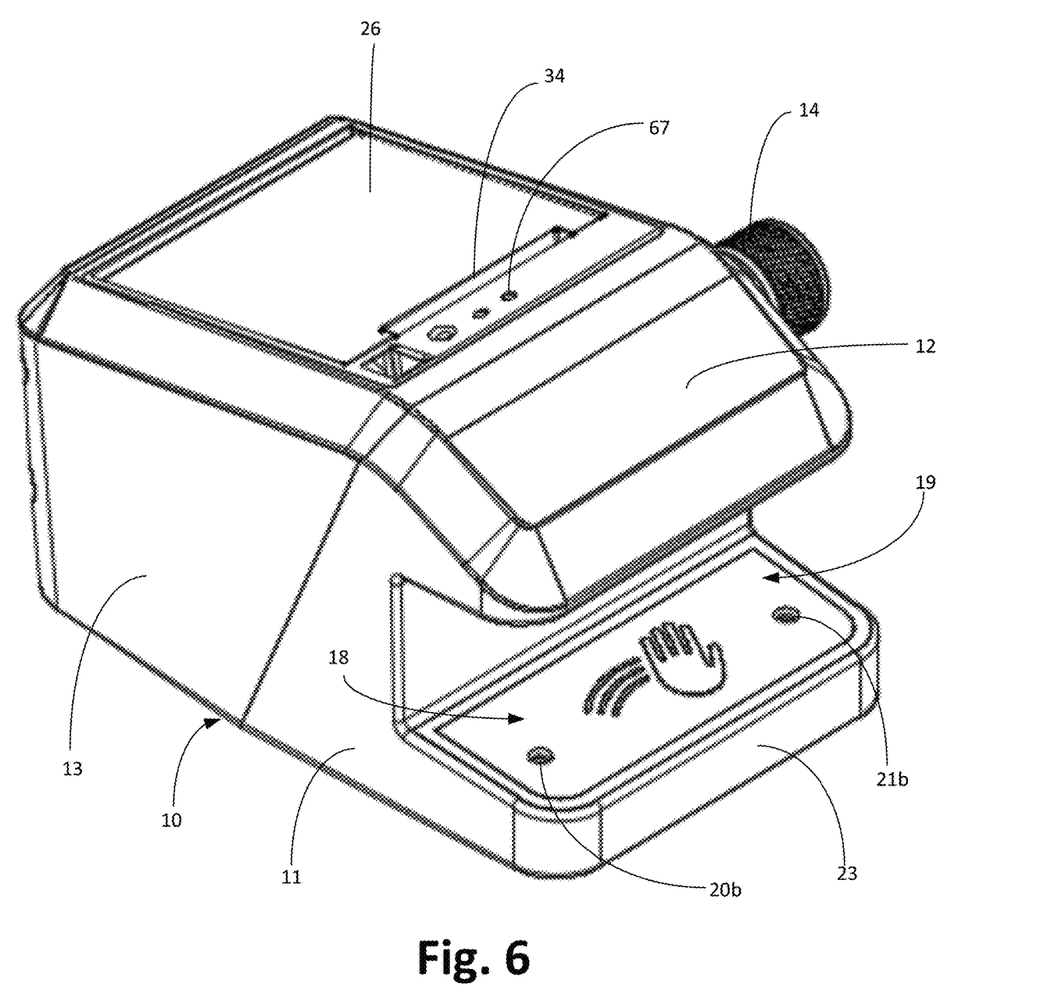
FIG. 6 shows a top front perspective view of a further embodiment of a touchless motion activated printer according to the present invention.
Figure 7:
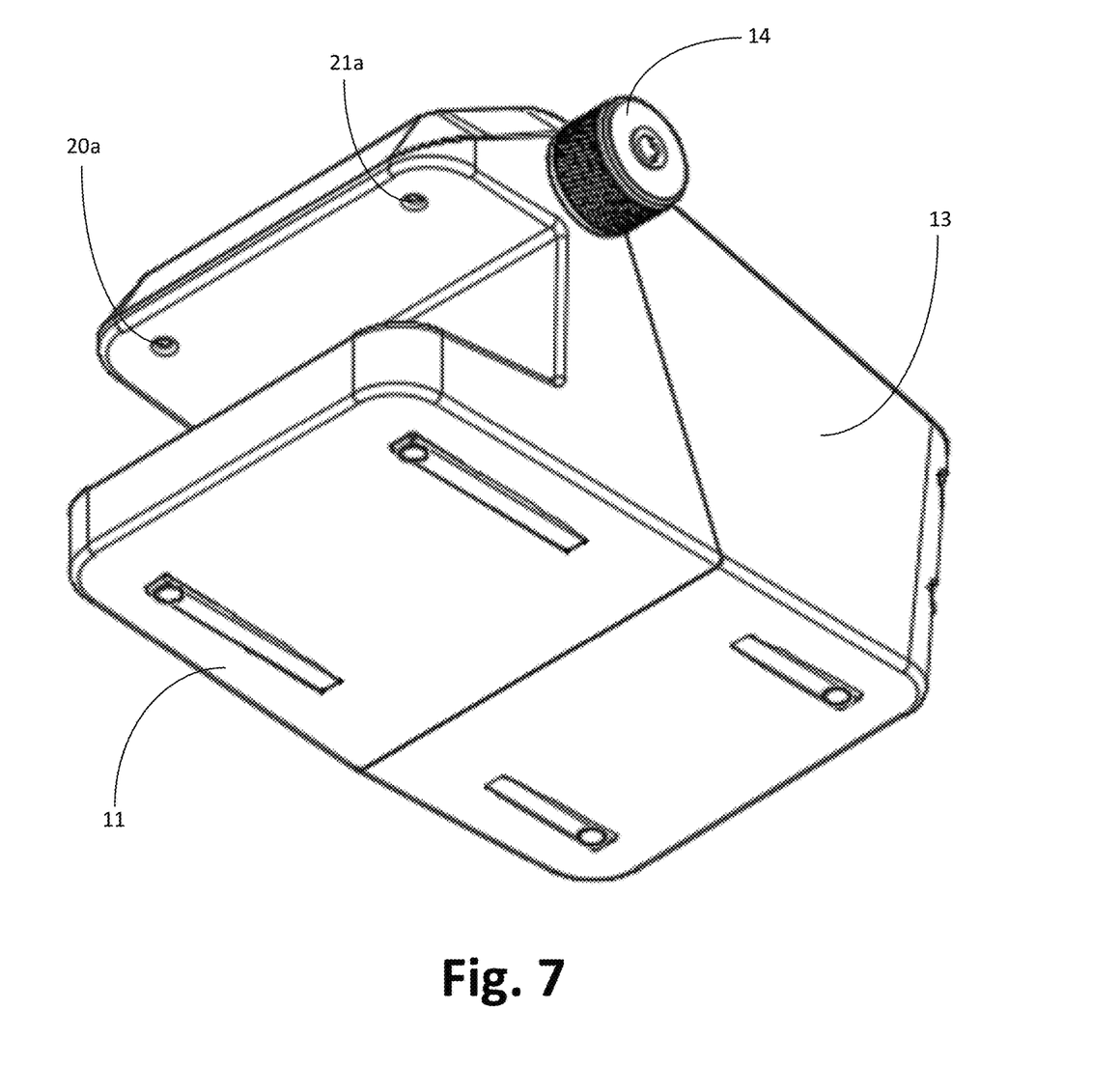
FIG. 7 shows a bottom front perspective view of the further embodiment of the touchless motion activated printer according to the present invention.

The computer readable instructions that can be stored on the computer readable medium 50 are included in the controller 44 and are adapted to provide the functionality to the user. The computer readable instructions can include instructions for scrolling through a set of alpha-numeric characters that can be shown on the display and scrolled through with the input knob. For example, and referring to FIG. 5, the input knob 14 can be used to scroll through a first selection screen 58 that can show several items such as DATE shown in screen 64a through 64c that can, for example, represent the date the item was placed in refrigeration, the date that the item expires, the date that that the item was purchased and the like. The ITEM can be used to determine what the item is such as "milk", "meat", "vegetables", and the like. The ID can be used to provide a unique identifier of the item such as letter, number, graphic (e.g. barcode) or a combination. The input now can be used to select ITEM. When the user then activates the knob (e.g. pushing it inwards) or one or more of the touchless input assemblies, the controller can move to the next screen 60 allowing the ITEM to be selected from a menu of items. The selections and entries can also be entered manually at screen 62a by using the knob 14 to scroll through alpha numeric characters, actuating the first touchless input assembly 16 to accept the selection and move to the next place as shown in screen 62b to enter the second character. The user can then actuate the second touchless input assembly 24 to accept the entered information without having to physically touch the printer.

Examples of options that can be selected include one or more of the following: print, reprint, enter, delete, character forward, character backward, menu up, menu down, selection up, selection down, or any combination. The fields that can be included are: expiration date, storage date, sell by date, use by date, current date, item type, unique identifier, graphic (e.g. barcode, QR code or the like), set reminder time, name (e.g. the item can be associated with a specific person such as a lunch for a child), and the like.

The computer readable instructions can be adapted to store the label information and if a label is printed with a time limitation (e.g. expiration date, storage date, sell by date, user by date, etc.) the display can show that certain items have "expired" and should be removed or discarded. This information can be shown on the display, transmitted to an IoT device such as IoT refrigerator, transmitted to a smart phone, sent to an email, text message or other communications avenue notifying the user of the expiration. The printer can be connected to the items above and home automation systems such as Amazon Alexa and Google Home allowing for functionality that include informing the home automation system that an item is expired or expiring, that a quantity of an item is below a predetermined level or that an item needs to be replenished. The unique identifier on the label can be used to scan the item/label when it is placed in storage or removed from storage allowing for the printer or other computer device to track inventory. For example, the printer can transmit information to a local computer 64 or server 66 and provide information about each label printed. A scanner associated with the local computer, server, home automation system or IoT device can be used to identify the item/label. Using the information from the label, one or more of the various computer systems can be used to place an order for items that are expired allowing for more accurate and timely reordering of items.

The printer 10 can utilize a thermal printer unit 55 (FIG. 9) and thus requires no ink refills. Label stock can be a backless sticker paper that leaves no residue on container and is easy to peel off.

In the arrangement where there are two sets/pairs of sensors (See FIGS. 9, 20a, 20b, 21a and 21b) that will allow a swipe to the left to print off a default label showing "in use date" and "use by date." When the user swipes to the right, the device can print the last used custom label that can be configured to say anything within the character count limit (16 characters on each of two lines in one embodiment and more lines and characters in other embodiments).

The display 12 can be exposed through an opening in the housing that can be a 16×2 Character LCD screen that can display the current "in use date" and "use by date." These dates can be updated by the controller/microcontroller 44 automatically. These dates can also be set by connecting to external sources through wired or wireless connections. The date can also be configured manually by the user or automatically if the there is a connection to an external source, in one embodiment.

The input knob 14 can drive a rotary encoder 17 (FIG. 9) that provides for all user input to the device. From this input knob 14, the user can select option so that the controller can connect to a wireless network, manually set the date, change the number of days between "in use date" and "use by date", create custom labels or print recently created custom labels. The input knob 14 can also be pressed allowing for another input device option for the controller.

Referring to FIGS. 6-9, an alternative embodiment of the touchless motion activated printer is shown. In this alternative embodiment, the form factor is changed but the functionality is the same as detailed herein for the embodiment described in FIGS. 1-5. Accordingly, as shown in the illustrated embodiment of FIGS. 6-9, the touchless motion activated printer includes a housing 10 that has a front body portion 11 and a rear body portion 13. A display 12 is disposed in a top front portion of front body portion 11. A transparent cover 15 is disposed over display 12 for protection. An input knob 14 is operatively associated with a rotary encoder 17 that is preferably carried in an upper inside portion of front body portion 11 for easy access and use. Rotary encoder 17 and display 12 are in electronic communication with controller 44. Input knob 14 can be rotated to scroll through operational settings and can be depressed to select printer options shown on display 12. In the illustrated embodiment of FIG. 9, transceiver 59 is included on controller 44 for communicating with IoT devices.

In the illustrated embodiment of FIGS. 6-9, a first touchless input assembly 16 is disposed in front body portion 11 of housing 10 in electronic communication with controller 44 for allowing interaction between a user and the printer without physical contact. The first touchless input assembly 16 can be included in a first input area 18 allowing an object such as the user's hand to pass between two sensors 20a and 20b horizontally separated. In a preferred embodiment, sensors 20a and 20b are IR beam sensors. In the illustrated embodiment, sensor 20a is dispose in an upper portion of front body portion defining a top portion of first input area 18. Sensor 20b is disposed in a lower portion of front body portion defining a bottom side of first input area 18. At least one of controller 44 and/or first touchless input assembly 16 can include a beam break sensor so that when a beam 22 (FIG. 1) is disrupted by an object, such as the wave of the hand, input is generated and can be recognized by controller 44. Input area 18 is shown disposed on one side of an opening defined as a large channel in front body portion 11 of housing 10. The input area 18 allows an object, such as a user's hand, to pass through the beam 22 created by sensors 20a and 20b to generate an input.

Preferably, housing 10 includes a second touchless input assembly 24 including two sensors 21a and 21b horizontally separated, as well as laterally spaced from sensors 20a and 20b of first touchless input assembly 16. In a preferred embodiment, sensors 21a and 21b are IR beam sensors. In the illustrated embodiment, sensor 21a is dispose in an upper portion of front body portion defining a top portion of a second input area 19. Sensor 21b is disposed in a lower portion 23 of front body portion 11 defining a bottom side of second input area 19. At least one of controller 44 and/or second touchless input assembly 24 can include a beam break sensor so that when a beam 22 (FIG. 1) is disrupted by an object, such as the wave of the hand, input is generated and can be recognized by controller 44. Second input area 19 is shown continuous with first input area 18 and disposed on one side of the opening defined as a large channel in front body portion 11 of housing 10. The second input area 19 likewise allows an object, such as a user's hand, to pass through the beam 22 created by sensors 21a and 21b to generate an input.

In the illustrated embodiment, a swipe floor housing 65 is provided for carrying sensors 20b and 21b in lower portion 23 of front body portion 11.

An access panel 26 is shown attached to a top side of rear body portion 13 of housing 10. Preferably access panel 26 is hingably or otherwise removably attached to rear body portion 13. The access panel 26 allows paper or label roll 30 to be placed in the housing 10 where it can rest on label support 32. A door release lever 69 is pivotally mounted to printer mount 70 disposed in housing 10 for controlling operation of access panel 26. A series of indicator lights 67 are preferably provided in electronic communication with controller 44 to provide status indicators for power, paper outage and the like as may be desired.

Figure 8:
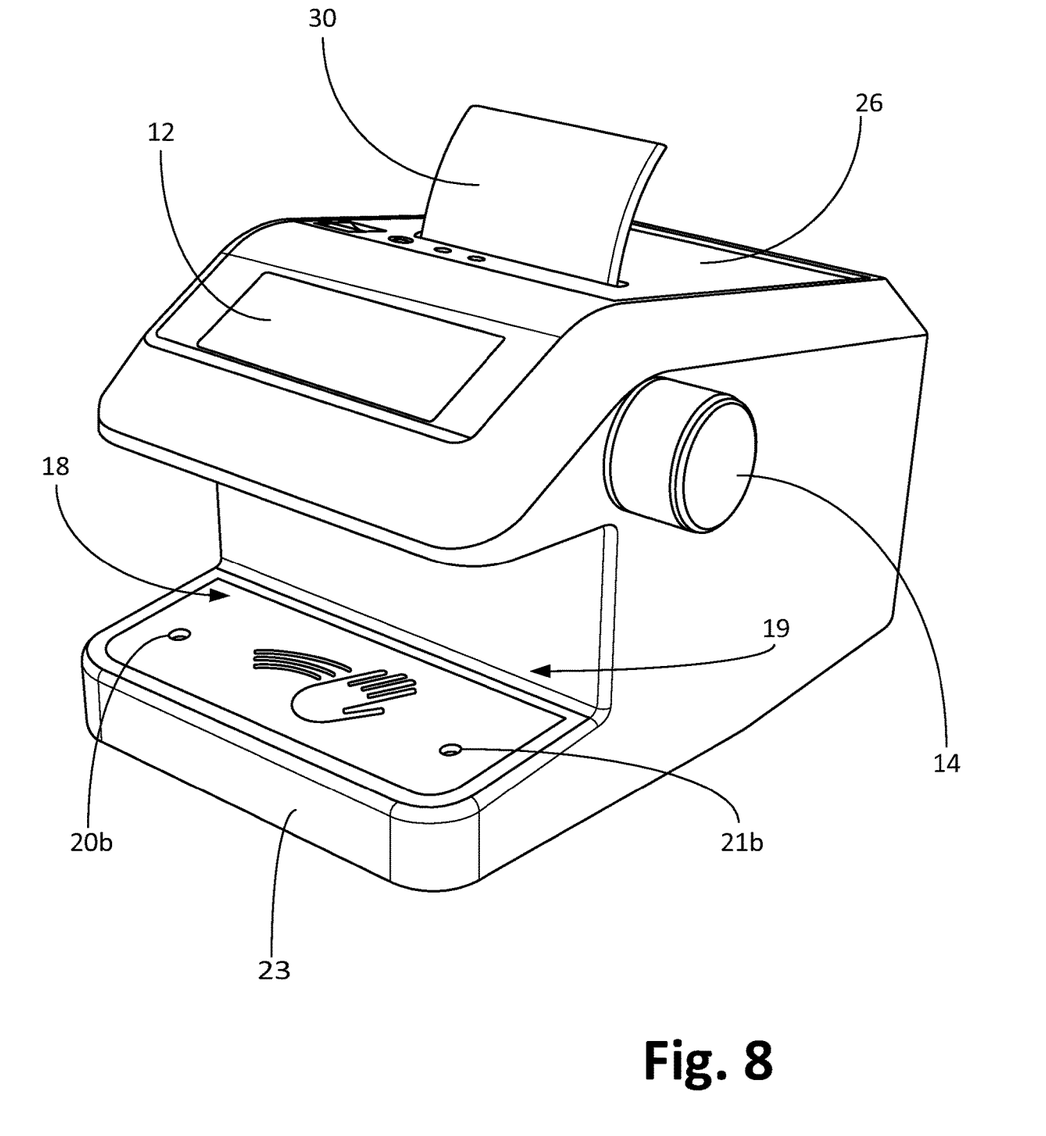
FIG. 8 shows a top front perspective view of the further embodiment of the touchless motion activated printer according to the present invention; and, FIG. 9 shows an exploded perspective view of the further embodiment of the touchless motion activated printer according to the present invention.

As best shown in FIG. 8, the label paper can be fed through slot 34 in a top side of rear body portion 13 and or access door 26. The slot can be adjacent to a tear bar or an auto cutter.

A printer unit 55 is disposed in rear body portion 13 and carried on a printer unit mount 70. Printer unit 55 preferably includes a thermal print head 53 operatively associated with the label paper 30 for printing alpha-numeric characters on the labels. Printer unit 55 includes a feeder motor 54 and auto-cutter 56 for directing paper through slot 34 and cutting the label from the roll of paper. Printer unit 55 may further include a printer PCB 72 in electronic communication with controller 44 for controlling operation of printer unit 55. Optionally, controller 44 may be in direct electronic communication with printer unit 55 for controlling printing functions.

The computer readable instructions on controller 44 provide for an operation wherein swiping a hand from the right to first engage second touchless input assembly 24 would produce a label with a first set of items, whereas swiping a hand from the left to first engage the first touchless input assembly 16 would produce a label with a second set of items different from said first set. For example, swiping from the right produces a label stating "IN USE" date and "USE BY" date, whereas swiping from the left produces a label stating the "CURRENT DATE", or other such custom label.

The description herein may be presented in terms of programming procedures modules or objects which are executed on a computer or a network of computers and are contained in a set of computer readable instructions. These procedural, modular, and object descriptions and representations are the means by which those skilled in the art must effectively convey the substance of their work to others skilled in the art. A procedure, object, module, or set of instructions as herein described, is generally a self-consistent sequence of steps leading to a desired result. These steps are those requiring physical manipulations of physical quantities. Usually, these quantities take the steps of electrical or magnetic signals capable of being stored, transferred, combined, compared, or otherwise manipulated within a computer readable medium. More specifically, a procedure, object, or module is a section of computer readable code which is designated to perform a specific task or tasks. The actual computer executable code may not be contained with one file or storage medium in order to constitute a procedure, object, or module. Procedures, objects, or modules may receive information (input) passed by another calling procedure, object, or module and may transmit information (output) to the calling procedure. The host is computer hardware capable of creating and processing computer readable instructions and it is not limited to a single computer. For example, storage medium, network communications, and main processing could be executed by three physically separate computers and would still constitute a host. Therefore, the term "host" is not intended to be limited to a single computer.

It is understood that the above descriptions and illustrations are intended to be illustrative and not restrictive. It is to be understood that changes and variations may be made without departing from the spirit or scope of the following claims. Other embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventor did not consider such subject matter to be part of the disclosed inventive subject matter.

What is claimed is:

1. A touchless motion activated printer comprising:
   a housing;
   an input area defined in the housing for receiving an object;
   a first sensor carried by the housing for detecting a first motion in the input area;
   a second sensor carried by the housing for detecting a second motion in the input area;
   a print head for printing alpha-numeric characters on a label;
   a feeder motor carried by the housing and adapted for ejecting the label from the housing;
   an input knob carried by the housing;
   a display carried by the housing;
   a controller carried by the housing and in communications with the first sensor, the second sensor, the print head, the feeder motor, the display and a smart appliance; and,
   wherein the controller includes a set of computer readable instructions adapted for scrolling through a set of fields according to actuation of the input knob, scrolling through a set of alpha-numeric characters according to actuation of the input knob, accepting entered information according to the first sensor detecting the first motion, and printing a label according to the second sensor detecting the second motion.

2. The printer of claim 1 wherein the input knob is adapted to rotate wherein the controller is configured for scrolling through the set of fields and scrolling through the set of alpha-numeric characters according to rotation of the input knob.

3. The printer of claim 1 wherein the input knob is adapted to be depressed wherein the controller is configured for scrolling through the set of fields according to depression of the input knob.

4. The printer of claim 1 wherein the set of fields include expiration date, storage date, sell by date, use by date, item type, unique identifier, graphic, reminder time, name, and any combination thereof.

5. The printer of claim 1 including a transmitter and the controller is adapted for transmitting an item information associated with a label to a remote compute device.

6. The printer of claim 5 wherein the item information is an expiration date printed on the label and associated with an item.

7. The printer of claim 6 wherein the item information is a reminder associated with the expiration date.

8. The printer of claim 1 wherein the controller is adapted to display an item information when the first sensor detects the first motion prior to the second sensor detecting the second motion.

9. The printer of claim 1 wherein the controller is adapted to print a label when the first sensor detects a first motion prior to the second sensor detecting the second motion.

10. The printer of claim 9 wherein the controller is adapted to display an item information when the second sensor detects the second motion prior to the first sensor detecting the first motion.

11. The printer of claim 1 wherein the smart appliance is configured to read the label as the label is placed in the appliance and transmit an item information to a remote computer device.

12. The printer of claim 1 wherein the controller is adapted to receive a set of item information wherein each item information includes an expiration date and is adapted to be printed in a label.

13. The printer of claim 12 wherein the controller is adapted to display a subset of item information wherein the expiration date is past a predetermined date.

14. The printer of claim 13 wherein the predetermined date is a current date determined by the controller.

15. The printer of claim 13 wherein controller is adapted to transmit an order instruction to a remote provider when the expiration date of an item information is past a predetermined date.

16. A touchless motion activated printer comprising:
a housing having an input area;
a sensor carried by the housing for detecting a motion in the input area;
a print head adapted to print alpha-numeric characters on a label;
a feeder motor carried by the housing and adapted for ejecting the label from the housing;
a display carried by the housing;
a controller carried by the housing and in communications with the sensor, the feeder motor, the print head and the display; and,
wherein the controller includes a set of computer readable instructions adapted for displaying a first set of alpha-numeric characters on the display, scrolling to a second set of alpha-numeric characters according to the sensor detecting a first motion in a first direction, displaying the second set of alpha-numeric characters on the display and printing a label according to the second set of alpha-numeric characters when the sensor detects a second motion in a second direction.

17. The printer of claim 16 wherein the label is adapted to be read by a smart appliance.

18. The printer of claim 16 wherein the second set of alpha-numeric characters is taken from the group consisting of expiration date, storage date, sell by date, use by date, item type, unique identifier, graphic, reminder time, name, and any combination thereof.

19. The printer of claim 18 wherein the input area is a recess defined in the housing wherein the sensor is disposed within the input area.

20. The printer of claim 18 wherein the controller is adapted for automatically determining an expiration date according to an item associated with the label to be printed.

21. The printer of claim 18 wherein the controller is adapted for transmitting an ordering information to a remote computer according to an approaching expiration date included in the label.

22. A touchless motion activated printer comprising:
a housing having a sensor for detecting a motion in an input area;
a print head adapted to print alpha-numeric characters on a label wherein the label is adapted to be ejected from the housing by a feeder motor;
a controller carried by the housing and in communications with the sensor, the feeder motor, the print head and a display; and,
wherein the controller includes a set of computer readable instructions adapted for displaying a first set of alpha-numeric characters on the display, scrolling to a second set of alpha-numeric characters according to the sensor detecting a first motion in a first direction, displaying the second set of alpha-numeric characters on the display and printing a label according to the second set of alpha-numeric characters when the sensor detects a second motion in a second direction.

* * * * *